United States Patent [19]

Watanabe et al.

[11] Patent Number: 4,723,290
[45] Date of Patent: Feb. 2, 1988

[54] SPEECH RECOGNITION APPARATUS

[75] Inventors: Sadakazu Watanabe, Kawasaki; Teruhiko Ukita, Fujisawa, both of Japan

[73] Assignee: Kabushiki Kaisha Toshiba, Kawasaki, Japan

[21] Appl. No.: 608,208

[22] Filed: May 8, 1984

[30] Foreign Application Priority Data

May 16, 1983 [JP] Japan .................................. 58-85241
Jan. 30, 1984 [JP] Japan .................................. 59-14710

[51] Int. Cl.$^4$ ................................................ G10L 5/00
[52] U.S. Cl. ...................................................... 381/43
[58] Field of Search ...................................... 381/41-43; 364/513.5

[56] References Cited

U.S. PATENT DOCUMENTS 4,446,531 5/1984 Tanaka ........................... 364/513.5
4,481,593 11/1984 Bahler ............................ 364/513.5
4,507,750 3/1985 Frantz et al. .................... 364/513.5

OTHER PUBLICATIONS

A First Course in Numerical Analysis, Chap. 9, Sec. 9-7-4, A. Ralston, "Relaxation," 1965.
IEEE Trans. on Systems, Man, and Cybernetics, vol. SMC-6, No. 6 (Jun. 1976), "Scene Labeling by Relaxation Operations," A. Rosenfield et al, pp. 420-433.
Electronics and Communications in Japan, vol. 46, No. 11, Nov. 1963, pp. 268-278, New York, USA; T. Sakai et al.: Speech-Recognition System for Conversation Sounds" *p. 274, left-hand column, line 7*.
Proceedings of the International Joint Conference on Pattern Recognition, Coronado, 8th-11th Nov. 1976, pp. 626-631, IEEE New York, USA; R. L. Kashyap et al.: "Word Recognition in a Multi-Talker Environment Using Syntactic Methods".

Primary Examiner—Emanuel S. Kemeny
Attorney, Agent, or Firm—Oblon, Fisher, Spivak, McClelland & Maier

[57] ABSTRACT

Speech recognition is improved by first recognizing a sequence of phonemes, then generating a compatibility coefficient between two continuous phonemes to modify the similarity measurements. The compatibility coefficient is varied for a plurality of modified similarity measurements to further improve recognition accuracy.

6 Claims, 12 Drawing Figures

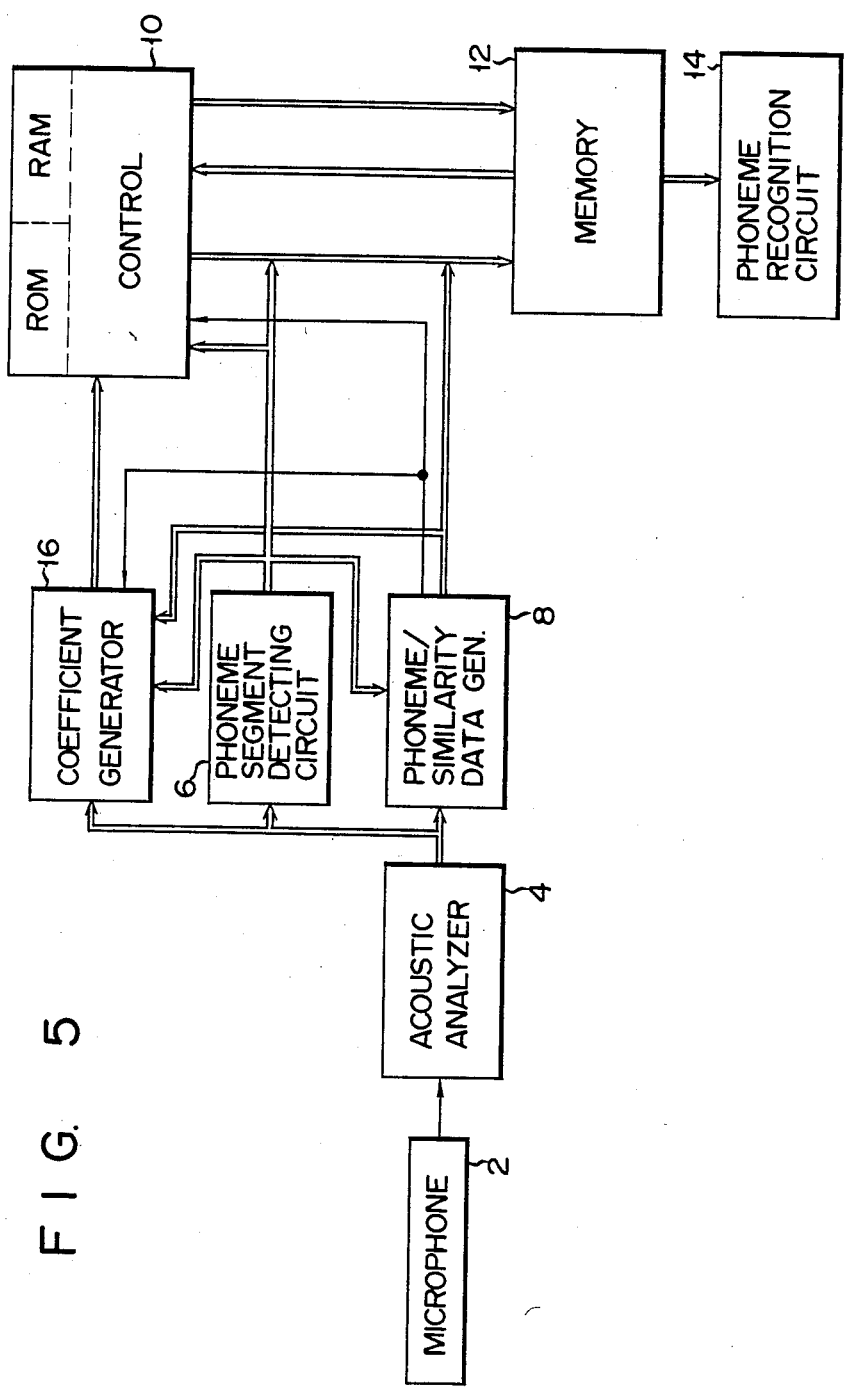
F I G. 5

FIG. 6A

| FRAME DATA | NUMBER OF PHONEME DATA | i |
|---|---|---|
| F1 | 3 | 1 |
| F2 | 2 | 2 |
| F3 | 1 | 3 |
| F4 | 3 | 4 |

FIG. 6B

| i | j | PHONEME DATA | SIMILARITY | PROBABILITY |
|---|---|---|---|---|
| 1 | 1 | o | 80 | 0.35 |
| 1 | 2 | a | 80 | 0.35 |
| 1 | 3 | e | 68 | 0.30 |
| 2 | 1 | m | 86 | 0.55 |
| 2 | 2 | N | 70 | 0.45 |
| 3 | 1 | s | 100 | 1.00 |
| 4 | 1 | a | 80 | 0.35 |
| 4 | 2 | e | 75 | 0.33 |
| 4 | 3 | o | 73 | 0.32 |

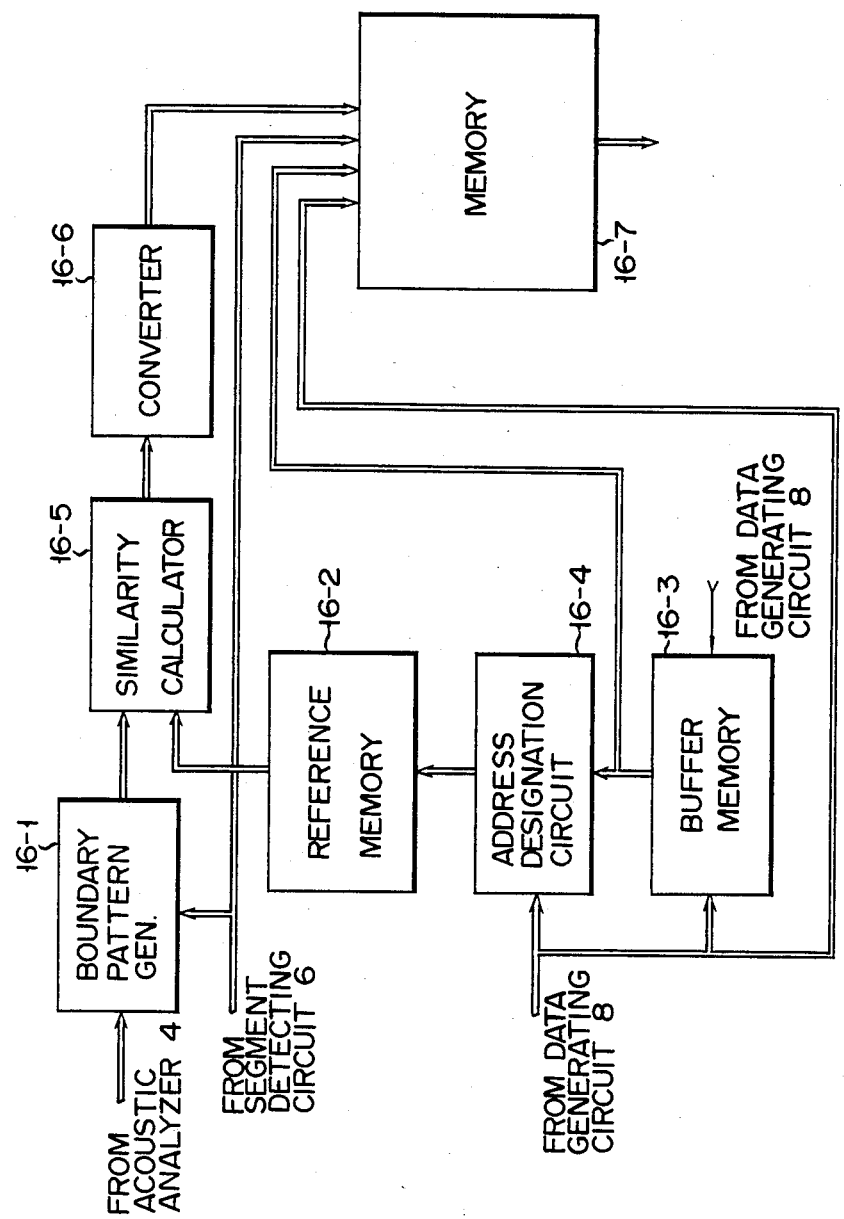

F I G. 8

| FRAME DATA | PRECEDING PHONEME DATA | PRESENT PHONEME DATA | COEFFICIENT |
|---|---|---|---|
| F1 | o | m | 0.8 |
| | a | m | 0.7 |
| | e | m | 0.5 |
| | o | N | 0.8 |
| | a | N | 0.7 |
| | e | N | 0.5 |
| F2 | m | s | 0.9 |
| | N | s | 0.8 |
| | s | a | 0.8 |

16-7

SPEECH RECOGNITION APPARATUS

BACKGROUND OF THE INVENTION

The present invention relates to a highly practical speech recognition apparatus capable of accurately recognizing an input speech continuously produced.

An automatic recognition of a speech is considered to be very important as an interface technique capable of inputting information directly from a human being to a machine. In this automatic speech recognition, a speech pattern obtained by continuously generating a sequence of phonetic symbols such as phonemes, syllables, words is converted into discrete phonetic symbols, and these discrete phonetic symbols are recognized.

A speech is generated by the physical change of a human sound generating organ, and individual phonetic symbols are not discretely generated. In other words, a speech pattern of a certain phonetic symbol in a continuously produced speech is affected by the influence of the speech pattern of the phonetic symbols at the front and rear of the phonetic symbol. For instance, when a phoneme is used as a phonetic symbol, a speech pattern of a phoneme of [i] in a word of [eit] is affected by the influence of a speech pattern of phonemes [e] and [t] at the front and rear of the phoneme [i]. Accordingly, even if the speech pattern of the phonene [i] is picked up and reproduced, it is difficult to recognize the speech pattern as [i]. When the word is used as a phonetic symbol, the part [v] of [faiv] of a row of numeric characters "54" is frequently weakened, but in case of a row of numeric characters "51", they are not almost weakened. In other words, even the same numeric character 5 takes different speech pattern in response to the conditions of generating the speech.

A speech pattern of phonetic symbol of a speech continuously generated by a human being is frequently altered by the influence of the speech pattern at the front and rear of the speech pattern, as described above. Thus, it is almost impossible to represent a certain phonetic symbol in a single speech pattern, to ignore the influence of the speech pattern at the front and rear of the symbol and to correctly recognize the phonetic symbol. Therefore, it is heretofore considered to prepare as a reference pattern a plurality of speech patterns for a certain phonetic symbols. However, when a number of deformed reference patterns are necessary for the individual phonetic symbols or when there are many words to be recognized, total number of the reference patterns to be prepared increases to huge quantity, resulting in a large problem in a practical use.

It is also considered heretofore to recognize the speech pattern after the influence of the speech pattern is eliminated at the front and rear of a certain speech pattern. However, in this case, in order to obviate the influence of the front and rear speech patterns on the certain speech pattern, it is required to decide in advance the phonetic symbols represented by these front and rear speech patterns. In addition, in order to decide the phonetic symbols at the front and rear of the symbol, it is required to decide the phonetic symbol of the above-described certain speech pattern. Thus, the successive speech patterns affect each other, and it is not simple to remove the influence.

SUMMARY OF THE INVENTION

It is an object of the present invention to provide a speech recognition apparatus capable of accurately recognizing a speech continuously generated.

This object is achieved by a speech recognition apparatus which comprises a data generator for detecting a segment in which each discrete phonetic symbol exists on the basis of acoustic parameter data sequentially generated in response to an input speech and generating phonetic symbol data corresponding to at least one reference phonetic symbol having a similarity larger than a predetermined value for a discrete phonetic symbol in each segment and a score data corresponding to the similarity, a memory for storing the phonetic symbol data and similarity data from this data generator, a coefficient generator for generating a compatibility coefficient between phonetic symbol data generated in two continuous segments, an operation circuit for updating the similarity data stored in the memory several times with the compatibility coefficient relative to the corresponding phonetic symbol data as a function, and a recognition circuit for reading out and recognizing the phonetic symbol data having the maximum similarly data in the individual segments from the memory.

Since the similarity data of the phonetic symbol data in each segment is updated with the compatibility coefficient relative to the phonetic symbol data as a function after storing at least one phonetic symbol data in each segment in the memory, a sequence of phonetic symbol data preferably corresponding to an input speech can be extracted in this invention so as to enhance the speech recognition efficiency.

BRIEF DESCRIPTION OF THE DRAWINGS

FIG. 5 is a block diagram showing a speech recognition apparatus according to another embodiment of the present invention;

FIGS. 6A and 6B are memory maps of a memory for storing frame data, phoneme data and similarity data in FIG. 5;

FIG. 7 is a block diagram showing a compatibility coefficient generator in FIG. 5; and FIG. 8 is a memory map of a memory for storing a compatibility coefficient in FIG. 7.

DETAILED DESCRIPTION OF THE PREFERRED EMBODIMENTS

Figure 1:
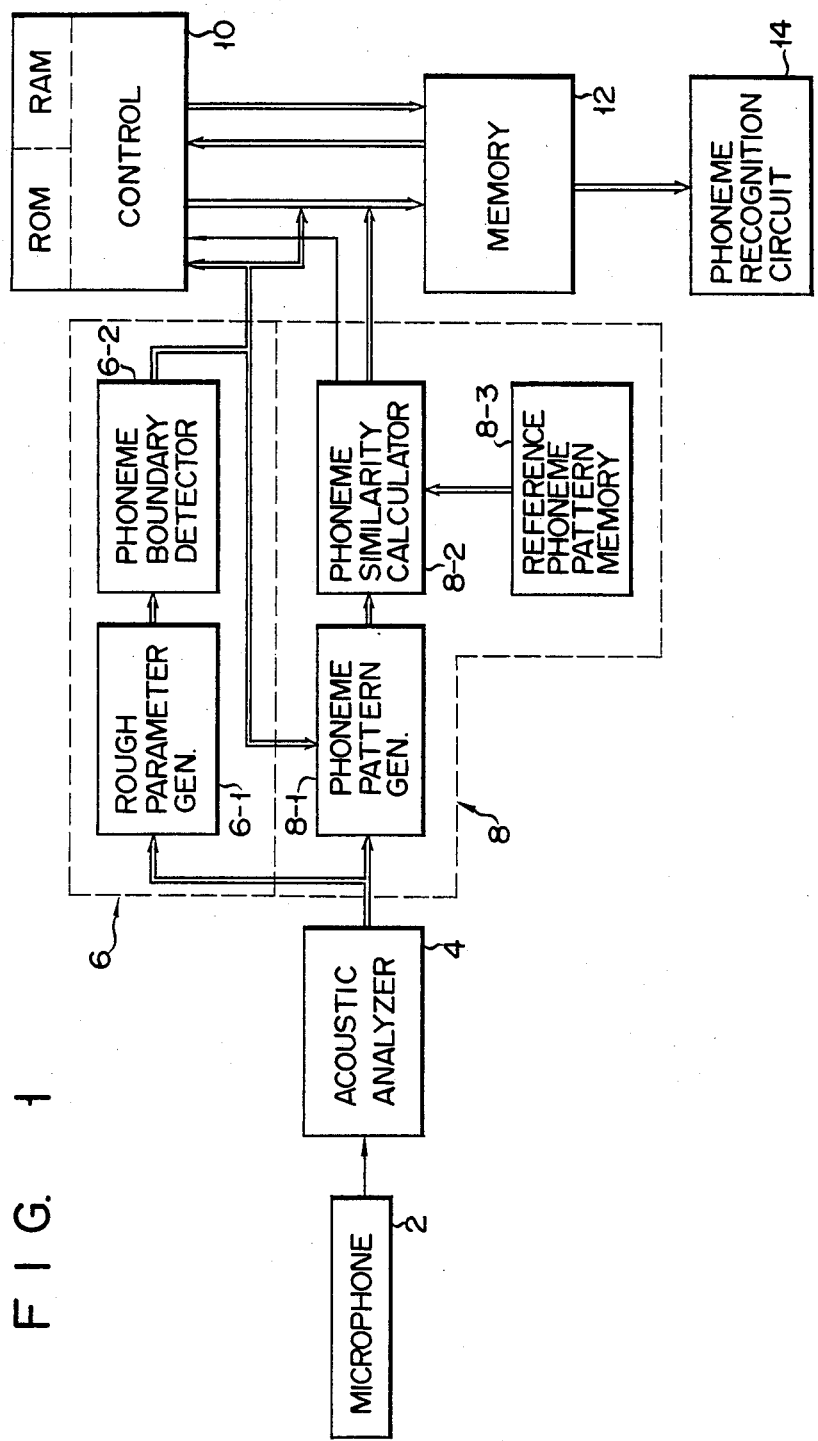
FIG. 1 is a block diagram of a speech recognition apparatus according to an embodiment of the present invention.

FIG. 1 is a block diagram of a speech recognition apparatus according to an embodiment of the present invention. This speech recognition apparatus includes a microphone 2 to generate an electrical speech signal in accordance with input speeches, an acoustic analyzer 4 for extracting acoustic feature parameter data from the speech signal supplied from the microphone 2 from each frame, a phoneme segment detecting circuit 6 for detecting the phoneme segment based on the acoustic feature parameter data from the acoustic analyzer 4, phoneme and similarity data generating circuit 8 for generating at least one phoneme data together with the similarity data in each phoneme segment detected by the segment detecting circuit 6, and a memory 12 for storing phoneme segment data from the segment detecting circuit 6 and phoneme data together with the similarity data from the data generating circuit 8.

This speech recognition apparatus further includes a control circuit 10 for storing phoneme data together with the similarity data from the data generating circuit 8 in the memory 12 in response to the output data from the segment detecting circuit 6. This control circuit 10 includes a random access memory (RAM) for storing in advance the compatibility coefficient data representing the compatibility coefficient between two successive phonemes and a read only memory (ROM) for storing a program for updating the similarity data or score data stored in the memory 12 based on the compatibility coefficient data.

The phoneme segment detecting circuit 6 includes a secondary parameter data generator 6-1 for extracting the acoustic power and the spectral change as secondary parameter data from a sequence of the acoustic feature parameter data from the acoustic analzyer 4 and a phoneme boundary detector 6-2 for detecting as the phoneme boundary a frame at which the minimal value of the acoustic power or the maximal value of the acoustic spectrum change is obtained based on the secondary parameter data from the secondary parameter data generator 6-1. Further, the phoneme and similarity data generating circuit 8 includes a phoneme pattern generator 8-1 for generating detail phoneme pattern data in accordance with the acoustic parameter data from the acoustic analyzer 4, and a phoneme similarity calculator 8-2 for calculating the similarity between the phoneme pattern data from the phoneme pattern generator 8-1 and those from a reference phoneme pattern memory 8-3 and generating phoneme data and corresponding similarity data when the similarity becomes higher than a predetermined value.

It is now considered that a speech representing the word [oNsei] is inputted to the microphone 2, and converted into a corresponding electrical speech signal and the resulting signal is supplied to the acoustic analyzer 4. Acoustic feature parameter data is extracted from this speech signal at every frame, e.g., at every 10 msec, and supplied to the phoneme segment detecting circuit 6 and the data generating circuit 8. The secondary parameter data generator 6-1 of the phoneme segment detecting circuit 6 which received the acoustic feature parameter data from the acoustic analyzer 4 generates secondary parameter data representing the acoustic power and acoustic spectrum change of the input phoneme. The phoneme boundary detector 6-2 generates as a phoneme boundary data the frame data representing the minimal value of the acoustic power or the maximal value of the spectrum change from the secondary parameter data generator 6-1.

Figures 2, 4A, 4B, 4C, 4D:
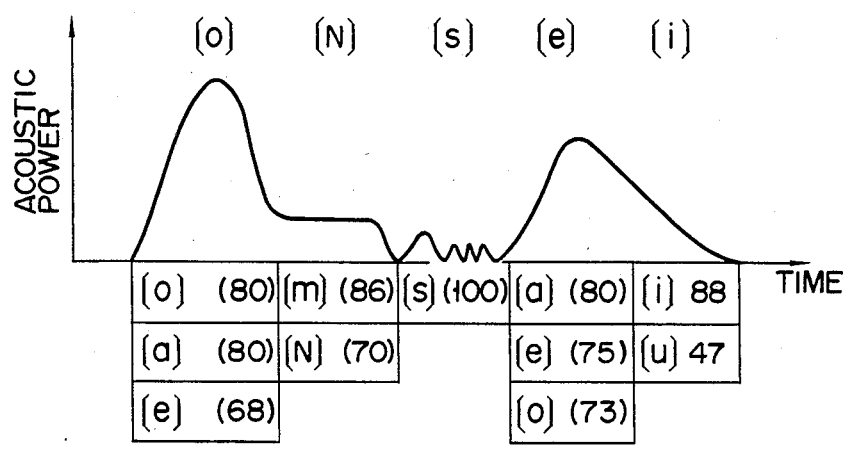
FIG. 2 is a characteristic curve of an acoustic power of an input speech [oNsei] (Japanese word for "speech") and phonetic segments and phoneme data detected along the acoustic power characteristic curve.
FIGS. 4A to 4D are views showing similarity ratio data obtained as a result of updating the similarity ratio data shown in FIG. 2 with a predetermined compatibility coefficient.

The phoneme pattern generator 8-1 sequentially stores the acoustic feature parameter data from the acoustic analyzer 4 and generates phoneme pattern data having a predetermined number of frames including as a leading frame a frame designated by the frame data from the phoneme boundary detector 6-2. The phoneme similarity calculator 8-2 calculates the similarity between the phoneme pattern data from the phoneme pattern generator 8-1 and the reference phoneme pattern data from the reference phoneme pattern memory 8-3. This phoneme similarity calculator 8-2 supplies a write command signal to the control circuit 10 whenever the similarity of both phoneme pattern data from the phoneme pattern generator 8-1 and the memory 8-3 exceeds a predetermined value, and supplies the similarity data higher than the predetermined value and the phoneme data corresponding to the reference phoneme pattern data of the similarity to the memory 12, and the control circuit 10 sequentially stores the phoneme data and similarity data from the phoneme similarity calculator 8-2 on the same column in the memory 12 in response to the write command signal from the phoneme similarity calculator 8-2 unless the frame data from the phoneme boundary detector 6-2 is altered. As shown, for example, in FIG. 2, when the fact that the phoneme data [o], [a] and [e] respectively have similarity data of 80, 80 and 68 for the input phoneme [o] is detected, these phoneme data [o], [a] and [e] are respectively stored together with the similarity data at three label positions on the same column in the memory 12. When the frame data from the phoneme boundary detector 6-2 are altered, the control circuit 10 sequentially stores the phoneme data and similarity data from the phoneme similarity calculator 8-2 on another column of the memory 12 in response to the write command signal. In the example in FIG. 2, phoneme data [m] and [N] for the input phoneme [N] are detected, and stored at two label positions on the same column of the memory 12. Similarly thereafter, phoneme data are detected for the input phonemes [s], [e] and [i], stored together with the similarity data in the memory 12. In the example of FIG. 2, the maximum value of the similarly is set to 100, and the phoneme data having the similarity larger than 40 is detected as effective phoneme data.

In the example in FIG. 2, a sequence of phonemes having high similarity becomes [omsai], because the feature parameter data in each phoneme segment is affected by the influence of the feature parameter data in the phoneme segments at the front and rear.

The control circuit 10 executes the following evaluation process as will be described so as to confirm the correct phoneme data by removing the influence between the feature parameter data.

Assume that the similarity ratio of the phoneme data $\alpha$ at the j-th label position obtained for the input phoneme in i-th phoneme segment Si (i=1 ... I) is represented by Pi($\alpha$j) and phoneme data $\beta$ and $\gamma$ are obtained at the phoneme segments S(i−1) and S(i+1) at the front and rear. (In the meantime, the index j is omitted, and the label $\alpha$ represents a phonemic label itself to make the explanation concise.) The probability of correctly recognizing two successive phonemes is called "a compatibility coefficient". For example, the compatibility coefficient for phoneme series ($\beta$, $\alpha$) is represented by r($\beta$, $\alpha$). This compatibility coefficient r($\beta$, $\alpha$) is utilized on the basis of the assumption that the probability of correctly recognizing the phoneme series ($\beta$, $\alpha$) is larger than the probability of erroneously recognizing other phoneme series ($\beta$, $\delta$) as the phoneme series ($\beta$, $\alpha$). The following Table indicates only the selected compatibility coefficients of the specific phoneme series. Accordingly, the blanks do not indicate that the compatibility coefficient is "0".

| β\α | a | i | u | e | o | N | m | s |
|---|---|---|---|---|---|---|---|---|
| a |  | 0.8 | 0.7 |  |  | 0.8 | 0.7 |  |
| i |  |  |  |  |  |  |  |  |
| u |  |  |  |  |  |  |  |  |
| e | 0.9 | 0.8 |  |  |  | 0.6 | 0.6 |  |
| o | 0.8 | 0.6 |  |  |  | 0.8 | 0.8 |  |
| N |  |  |  |  |  |  |  | 0.8 |
| m |  |  |  |  |  |  | 0.7 |  |
| s | 0.8 |  |  | 0.8 | 0.8 |  |  |  |

The control circuit 10 stores the compatibility coefficient data indicated in this table in the RAM, and updates the similarity ratio stored in the memory in accordance with the compatibility coefficient data. For example, the similarity ratio $P_i^k(\alpha)$ applied when the similarity ratio of the phoneme data α is updated K times is given by the following formulae:

$$P_i^k(\alpha) = Q_i^k(\alpha) / \sum_\alpha Q_i^k(\alpha) \quad (1)$$

$$Q_i^k(\alpha) = P_i^{(k-1)}(\alpha) \times \left\{ 1 + \sum_\beta P_{(i-1)}^k(\beta) \cdot r(\beta, \alpha) + \sum_\gamma P_{(i+1)}^{(k-1)}(\gamma) \cdot r(\alpha, \gamma) \right\} \quad (2)$$

where $P_0^k(\beta) = P_{(I+1)}^k(\gamma) = 0$

In the formula (2), a calculation is executed with the compatibility coefficient as a function so as to remove the mutual influence of the phoneme data β and α as well as α and γ in the adjacent segments. The $Q_i^k(\alpha)$ thus obtained by the formula (2) is substituted for the formula (1), and normalizing is executed so that the sum of similarity ratios in the respective segments becomes 1. The similarity ratio thus updated is stored as the similarity ratio of the corresponding phoneme data in the memory. Similar process is executed for the all segments of the speech interval, and the similarity ratio of each phoneme data is updated.

In the formulae (2), $P_{i-1}^{k-1}(\beta)$ may be substituted for the $P_{i-1}^k(\beta)$. Further, the initial value of the similarity ratio of k=1 may be determined as the similarity ratios of a plurality of phoneme data given for the same input phoneme from the phoneme and similarity data generating circuit 8.

Figure 3:
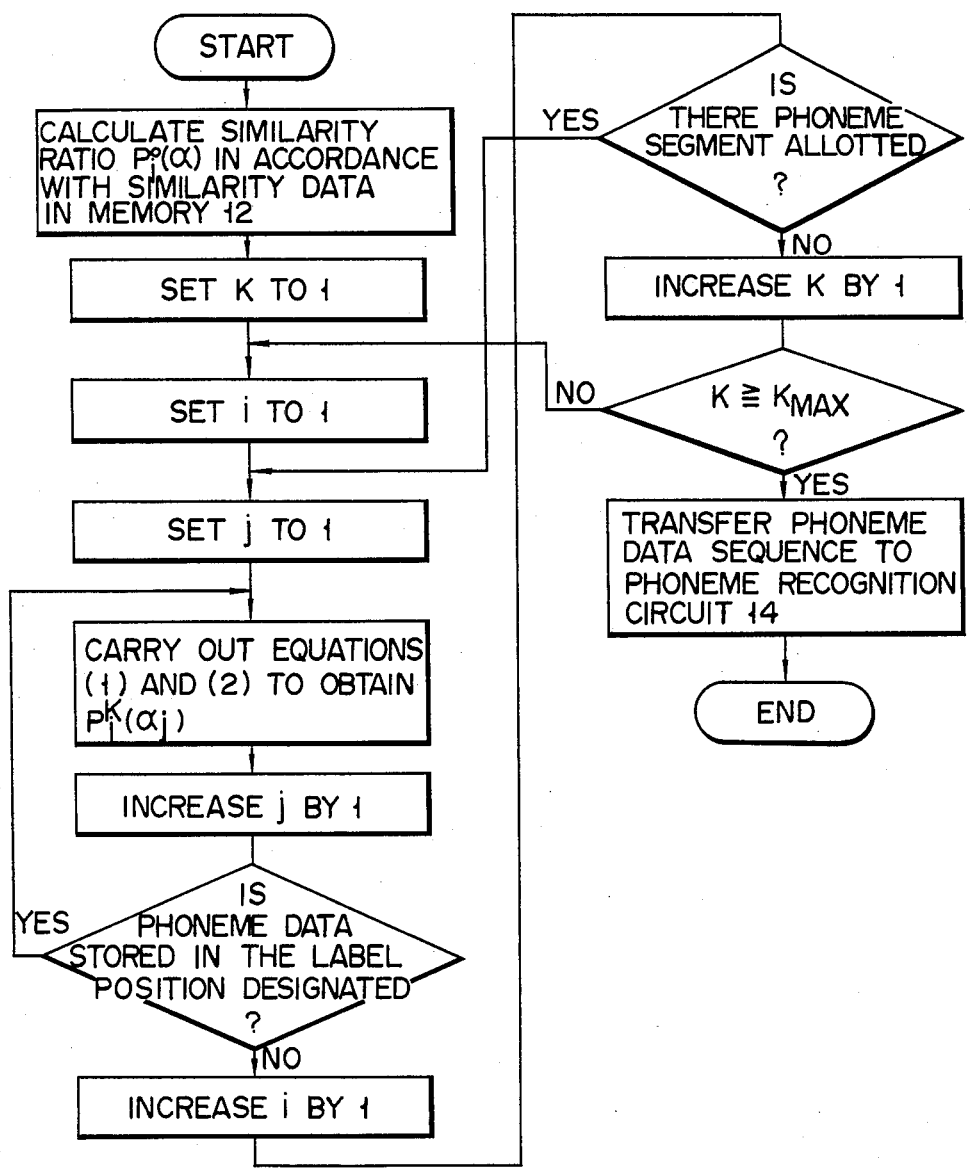
FIG. 3 is a flowchart for describing the operation of the speech recognition apparatus in FIG. 1.

FIG. 3 shows a flowchart of the similarity ratio updating operation of the control circuit 10.

This control circuit 10 first reads out the similarity data stored on the same column in the memory 12, calculates the ratio $P_i^0(\alpha_j)$ of the similarity data, and stores the similarity ratio at the corresponding memory locations in the memory 12. Then, updating number k, the segment number i and the label number j are set to "1", the formula (2) is executed, to obtain $Q_i(\alpha_1)$ which is stored in the corresponding memory location in the memory 12. Then, the j is increased by 1, the formula (2) is calculated, to obtain $Q_i(\alpha_2)$, which is stored in the corresponding memory location in the memory 12. When all the similarity ratios on the same column are thus updated, the i is increased by 1 so as to specify the next phoneme segment, and the similarity ratio in the second column is updated in the same manner as described above. Further, when the updating process is advanced so that the similarity ratios in the last phoneme segment are all updated, the k is increased by 1.

The above-described operation is repeatedly executed, and when the k becomes the maximum $k_{max}$, this updating operation is finished.

FIGS. 4A to 4D show the similarity ratios as k=0, 1, 5 and 10 when the similarity data shown in FIG. 2 are updated by using the compatibility coefficients listed in the above Table. As apparent from FIGS. 4A to 4D, the similarity ratios gradually vary as the updating process is advanced. This represents that the influence between the phoneme data in the adjacent segments is gradually removed. For example, in the result of the updating process in case of k=5, as shown in FIG. 4C, the phoneme data [N] has a similarity ratio larger than that of the phoneme data [m], and the phoneme data [e] in the phoneme segment continued after the phoneme data [s] has the maximum similarity ratio. Thus, a sequence [oNsei] of the phoneme data each having the maximum similarity ratio at each phoneme segment is obtained. Even if this updating process is further advanced, the phoneme data sequence is not changed. This phoneme data sequence [oNsei] is transferred to the phomeme recognition circuit 14 after the updating operation is terminated, and then recognized.

FIG. 5 shows a block diagram of a speech recognition apparatus according to another embodiment of the present invention. This speech recognition apparatus is constructed similarly to that, shown in FIG. 1 except that it further includes a compatibility coefficient generating circuit 16 which calculates compatibility coefficients with respect to the two successive phonemes based on the acoustic feature parameter data from an acoustic analyzer 4, the data from a phoneme segment detecting circuit 6 and the phoneme data from a phoneme and similarity data generating circuit 8, and supplies the coefficient to the control circuit 10.

In this embodiment, a memory 12 includes a pointer table and a register section respectively shown in FIGS. 6A and 6B. The pointer table stores a frame data indicating the leading frame, the number of phoneme data having the similarity ratio larger than a predetermined value in the same frame, and phoneme segment number i corresponding to the frame data. The register section stores a phoneme segment number i, a label number j, phoneme data, similarity data and similarity ratio.

The coefficient generator 16 calculates the compatibility coefficient by calculating the matching between the input boundary pattern data of a predetermined number of frames between the two successive phoneme segments and the corresponding data of the reference boundary pattern data registered in advance. For example, in the example in FIG. 6B, the compatibility coefficient between the phoneme data [o] in the first phoneme segment (i=1) and the phoneme data [m] in the second phoneme segment (i=2) is obtained by calculating the matching degree between the input boundary pattern data between the first and second phoneme segments and the reference boundary pattern data and converting the resulting similarity.

This matching process may be executed by utilizing the conventional dynamic programming method, multiple similarity calculation or statistic distance calculation well know in the pattern recognition technique. When the matching process is executed by the multiple similarity calculation, the coefficient generating circuit 16 is, for example, composed as shown in FIG. 7. More particularly, this coefficient generating circuit 16 includes a boundary pattern generator 16-1 having a buffer for storing a predetermined number of frames of acoustic feature parameter data, a reference memory 16-2 for storing a plurality of reference boundary pattern data, a memory 16-3 for storing all phoneme data in the phoneme segments S(i−1) and Si, an address designation circuit 16-4 for supplying address data produced on the basis of a combination of the phoneme data generated in the phoneme segment Si and the phoneme data in the phoneme segment S(i−1) stored in the memory 16-3 to the memory 16-2, and a similarity calculator 16-5 for calculating the similarity between the boundary pattern data from the boundary pattern generator 16-1 and the memory 16-2.

The boundary pattern generator 16-1 generates the boundary pattern data of N frames with the frame designated by the frame data from the segment detecting circuit 6 as a center frame. On the other hand, the address designation circuit 16-4 generates the address data in accordance with a combination of the phoneme data from the data generating circuit 8 and one of phoneme data in the phoneme segment S(i−1) stored in the buffer memory 16-3. Thus, the reference boundary pattern data generated from the reference memory 16-2 is calculated in the similarity with respect to the boundary pattern data from the boundary pattern generator 16-1 in the similarity calculator 16-5. When this similarity calculator 16-5 finishes to calculate the similarity, the buffer memory 16-3 generates another phoneme data in the phoneme segment S(i−1). Thus, another reference boundary pattern data is generated from the reference memory 16-2, and calculated in the similarity with respect to the boundary pattern data from the boundary pattern generator 16-1.

The similarity data from the similarity calculator 16-5 is supplied to a converter 16-6, the similarity given, for example, in a range of 0 to 100 is converted to the compatibility coefficient having values of a range of 0.0 to 1.0. It is noted that a mapping function used for calculating the compatibility coefficient may be a linear or non-linear function. The compatibility coefficient from the converter 16-6 is stored together with the frame data representing the boundary between the successive phonemes and the two phoneme data which have given the compatibility coefficient in a memory 16-7. For instance, this memory 16-7 includes memory areas for storing "frame data", "preceding phoneme data", "present phoneme data" and "coefficient" as shown in FIG. 8.

When frame data, phoneme data and similarity data relating to the word [oNsei] are all stored in the memory 12 as shown in FIGS. 6A and 6B and frame data representing the phoneme boundary, successive phoneme data and compatibility coefficient data are all stored in the memory 16-7 as shown in FIG. 8, the control circuit 10 executes the updating process of the similarity data based on these data.

Assume that the similarity value of the phoneme data $\alpha$ in j-th label position (instead of $\alpha j$, $\alpha$ is used for simplicity) obtained for the input phoneme in i-th phoneme segment Si is represented by $SVi(\alpha)$, the probability (similarity ratio) $P_i^0(\alpha)$ that the phoneme data $\alpha$ is determined correct in the phoneme segment Si is given by the following formulae:

$$P_i^0(\alpha) = SV(\alpha)/\sum_y SV(\alpha) \qquad (3)$$

The similarity ratio $P_i^k(\alpha)$ after k updating processes is given by the following formulae $$P_i^k(\alpha) = T_i^k(\alpha)/\sum_\alpha T_i^k(\alpha) \qquad (4)$$

$$T_i^k(\alpha) = P_i^{k-1}(\alpha) \times \left\{ 1 + \sum_\beta P_{i-1}^k(\beta) \cdot \gamma(\beta, \alpha; F) + \sum_\gamma P_{i+1}^{k-1}(\alpha) \cdot r(\alpha, r; F) \right\} \qquad (5)$$

where F represents a boundary frame number.
Then, $$P_0^k(\alpha) = P_{I+1}^k(\alpha) = 0$$

This calculation is not based on the predetermined compatibility coefficients, but executed substantially in the same manner as the previous example except that the calculation is executed based on compatibility coefficients determined in accordance with a speech input. The similarity ratio $P_i^0(\alpha)$ is first calculated from the similarity of the phoneme data in each phoneme segment. Then, a frame data F is designated, the similarity ratio $P_{i-1}^k(\beta)$ of the corresponding phoneme data $\beta$ is read out from the memory 12, the compatibility coefficient $r(\beta, \alpha; F)$ for the phoneme series $(\beta, \alpha)$ is read out from the memory 16-7, and the product $P_{i-1}^k(\beta) \cdot r(\beta, \alpha; F)$ is calculated. Then, similar calculation is executed for the phoneme series $(\alpha, \gamma)$, and the product $P_{i+1}^{k-1}(\gamma) \cdot r(\alpha, \gamma; F)$ is obtained. These products are substituted in the formula (5), and $T_i^k(\alpha)$ is obtained. Similar calculation is executed all for all the phoneme data in the same phoneme segment, and $P_i^k(\alpha)$ is calculated in accordance with the formula (4), and is substituted for $P_i^{k-1}(\alpha)$, and stored in the memory.

The calculation for this updating process is finished when executed for predetermined times, or when the maximum value of the probability obtained in each phoneme segment exceeds a predetermined value.

In this embodiment, the compatibility coefficients necessary in response to the input speech signal are calculated, and the input speech can be accordingly accurately recognized.

The present invention has been described in the embodiments described above. The present invention is not limited to the particular embodiments described above. For example, the phoneme segment detecting circuit 6 may include a rough pattern data generator for generating rough feature pattern data based on the parameter data from the acoustic analyzer 4 and a similarity calculator for calculating the similarity between the rough feature pattern data and a plurality of reference rough feature pattern data registered in advance and generating a phoneme boundary signal when detecting the fact that the maximum similarity for the input rough feature pattern data becomes smaller than a predetermined value.

Further, a measure such as distance may be used instead of the similarity.

Moreover, when the phoneme in a certain phoneme segment is affected by the influence of the phonemes in the phoneme segments at the front and rear of the phoneme segment, it is weighted in response to the distance between the phonemes, and then the formulae (1) and (2) may be calculated. In other words, the following formula is calculated instead of the formula (2) as the weight $W_{ij}(=1/|i-j|)$ to advance the updating process.

$$Q_i(\alpha) = P_i^{k-1}(\alpha) \times \left\{ 1 + \sum_{j<i} W_{ij} \cdot \sum_{\beta} P_i^k(\beta) \cdot r(\beta, \alpha) + \sum_{j<i} W_{ij} \cdot \sum_{\gamma} P_j^{k-1}(\gamma) \cdot r(\alpha, \gamma) \right\} \quad (6)$$

In this case $W_{ij}=1$ is, for example, applied to a speech segment adjacent to a certain speech segment, and preferable result can be obtained by giving the $W_{ij}$ of 0.5, 0.3, ... to a segment as it gradually separates from the certain speech segment.

In addition, the formulae (1) and (2) are represented as a linear updating process. However, the formulae (1) and (2) may also use a non-linear relation formula represented by a product, for example.

In the embodiments described above, the phonemes have been used as the phonetic symbol. However, syllable or word may also be used instead. In the embodiment shown in FIG. 5, each segment may be composed of phoneme series of V-C-V (vowel-consonant-vowel), and the coefficient generator 16 which receives the phoneme series may determine the compatibility coefficient by calculating the matching degree between the input pattern data and C-V-C or V-sole reference pattern data.

Further, the memory 16-7 in FIG. 7 may be omitted, and the frame data, phoneme data and compatibility coefficient may be stored in the RAM of the control circuit 10.

What is claimed is:

1. A speech recognition apparatus comprising:
   parameter generating means for sequentially generating acoustic parameter data corresponding to input speech;
   data generating means for detecting a segment in which each discrete phonetic symbol exists on the basis of acoustic parameter data from said parameter generating means and generating phonetic symbol data corresponding to at least one reference phonetic symbol having a similarity larger than a predetermined value with respect to the discrete phonetic symbol in each segment and score data corresponding to the similarity;
   memory means for storing the phonetic symbol data and score data from said data generating means;
   coefficient generating means connected to said parameter generating means and data generating means and for generating compatability coefficient between phonetic symbols generated in two continuous segments;
   updating means for updating plural times the score data in said memory means with compatibility coefficient relating to the corresponding phonetic symbol data as a function; and
   recognition means for sequentially reading out from said memory means phonetic symbol data having the maximum score data in each segment after the updating process is finished, and then recognizing the sequence of phonetic symbol data.

2. A speech recognition apparatus according to claim 1, wherein said compatibility coefficient generating means comprises a memory for storing a plurality of relative recognition coefficient data respectively representing the compatibility coefficients between two preselected continuous phoneme symbol data.

3. A speech recognition apparatus according to claim 2, wherein said data generating means comprises a segment detecting circuit connected to said parameter generating means and for detecting each segment on the basis of the acoustic parameter data from said parameter generating means, reference pattern generating means for generating a plurality of reference pattern data representing a plurality of reference phonetic symbols, and score calculating circuit connected to said segment detecting circuit and reference pattern generating means and for generating corresponding phonetic symbol data and score data when the score having a value higher than a predetermined value is obtained by calculating the score corresponding to the similarity between the acoustic pattern data composed of the acoustic parameter data generated from said parameter generating means and the reference pattern data from said reference pattern generating means in each segment detected by said segment detecting circuit.

4. A speech recognition apparatus according to claim 3, wherein said coefficient generating means comprises a memory for storing a plurality of reference boundary pattern data respectively representing acoustic features between two continuous phonetic symbols, score data generator connected to said memory and parameter generating means and for generating score data corresponding to the similarity between boundary pattern data composed of a predetermined number of acoustic parameter data generated from said parameter generating means between two successive segments and reference boundary pattern data read out from said memory in accordance with the phonetic symbol data in these continuous segments, and a second memory for storing score data from said score data generator.

5. A speech recognition apparatus according to claim 4, wherein said data generating means comprises a segment detecting circuit for detecting each segment on the basis of the acoustic parameter data from said parameter generating means, reference pattern generating means for generating a plurality of reference pattern data representing a plurality of reference phonetic symbols, and score calculating circuit for generating corresponding phonetic symbol data and score data when the score having a value higher than a predetermined value is obtained by calculating the score corresponding to the similarity between the acoustic pattern data composed of the acoustic parameter data generated from said parameter generating means and the reference pattern data from said reference pattern generating means in each segment detected by said segment detecting circuit.

6. A speech recognition apparatus according to claim 1, wherein said data generating means comprises a segment detecting circuit for detecting each segment on the basis of the acoustic parameter data from said parameter generating means, reference pattern generating means for generating a plurality of reference pattern data representing a plurality of reference phonetic symbols, and score calculating circuit for generating corresponding phonetic symbol data and score data when the score having a value higher than a predetermined value is obtained by calculating the score corresponding to the similarity between the acoustic pattern data composed of the acoustic parameter data generated from said parameter generating means and the reference pattern data from said reference pattern generating means in each segment detected by said segment detecting circuit.

* * * * *